US012706947B2

(12) United States Patent
Feige et al.

(10) Patent No.: US 12,706,947 B2
(45) Date of Patent: Aug. 11, 2026

(54) THREAT DETECTION IN A NETWORKED ENVIRONMENT AND CORRECTIVE ACTIONS TO ADDRESS THE THREAT

(71) Applicant: The Toronto-Dominion Bank, Toronto (CA)

(72) Inventors: Erich Feige, Toronto (CA); Mariam Mourtada, Vienna (CA)

(73) Assignee: The Toronto-Dominion Bank, Toronto (CA)

(*) Notice: Subject to any disclaimer, the term of this patent is extended or adjusted under 35 U.S.C. 154(b) by 59 days.

(21) Appl. No.: 18/980,563

(22) Filed: Dec. 13, 2024

(65) Prior Publication Data

US 2026/0172443 A1 Jun. 18, 2026

(51) Int. Cl.
*H04L 9/40* (2022.01)

(52) U.S. Cl.
CPC ...... *H04L 63/1441* (2013.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 9,392,015 B2 * | 7/2016 | Thomas | .............. | H04L 63/1416 |
| 2019/0319961 A1 * | 10/2019 | Levy | ....................... | G06F 21/45 |
| 2020/0076835 A1 * | 3/2020 | Ladnai | ................... | G06N 20/20 |
| 2023/0114719 A1 * | 4/2023 | Thomas | ................ | G06F 21/552<br>726/22 |
| 2023/0185945 A1 * | 6/2023 | Levy | ....................... | G06F 21/45<br>726/23 |

* cited by examiner

*Primary Examiner* — Atta Khan
(74) *Attorney, Agent, or Firm* — Rowand LLP

(57) ABSTRACT

Methods, systems, and apparatuses, including computer programs encoded on computer storage media, for generating a data structure that includes entity information and casing information associated with the entity across one or more enterprise team servers. The data structure is then used to determine a corrective action, which is subsequently performed. Because of how the described techniques generate the data structure and determine a corrective action, the described techniques can enhance threat detection, improve risk assessment, and increase incident resolution throughput of a networked system. The data structure may be provided for use in performing a downstream task, wherein the downstream task comprises using a machine learning model to process the data structure.

16 Claims, 5 Drawing Sheets

500

THREAT DETECTION IN A NETWORKED ENVIRONMENT AND CORRECTIVE ACTIONS TO ADDRESS THE THREAT

TECHNICAL FIELD

The present disclosure relates to computer-implemented methods, software, and systems for evaluating risks posed by entities in a digital networked environment and taking corrective action to mitigate those risks posed to the networked environment.

BACKGROUND

Digital threat actors pose significant risks to networked environments. Examples of these threats include payment fraud, online banking fraud, investment scams, account takeovers, and data breaches. In such environments, information about various threats and digital actors are often stored in disparate servers and managed by different teams, leading to silos that hinder comprehensive threat analysis and response. This fragmentation can delay the detection of coordinated attacks and impede the implementation of effective security measures, thereby increasing the overall risk to the networked environment. Thus, appropriately coordinating parallel non-overlapping security investigation efforts among teams enables accurate and quick identification of threat actors and mitigating the risk these actors pose.

SUMMARY

This specification relates to computer-implemented methods, software, and systems for evaluating risks posed by entities in a digital networked environment and taking corrective action to mitigate those risks posed to the networked environment. In some implementations, the described techniques generate a data structure that includes entity information for a digital entity and casing information associated with the digital entity across one or more servers, e.g., in an enterprise setting (i.e., environments that supports business operations, services, and so on). As explained throughout this document, each server may correspond to, e.g., a business unit, a department, or a group of individuals (generally referred to herein as enterprise team) in the enterprise environment. The casing information indicates, for each server corresponding to a particular enterprise team, whether the enterprise team maintains cases regarding the digital entity and the status of those cases (e.g., whether the case is active, open, or unresolved). Using the techniques described in this application, the data structure, including the entity information and casing information, can be used to evaluate a threat for one or more digital entities, and a corrective action can be determined to address or mitigate the posed threat. Then the system performs the corrective action.

The subject matter described in this specification can be implemented in particular embodiments so as to realize one or more of the following advantages.

Appropriately coordinating parallel non-overlapping security investigation efforts among teams ensures the accurate and quick identification of entities that are threat actors and mitigates the risk these entities/threat actors pose. In some implementations of the techniques described herein, security investigations efforts are organized into security investigation cases (or simply, cases), i.e., structured digital files where relevant data about security incidents are documented. So, the ability to centralize casing information from a plurality of enterprise team servers regarding an entity in a complete, efficient, and consistent way can be beneficial for organizational operations to mitigate security threats. Identifying if an entity that is a potential threat actor has associated cases across one or more teams with at least one open case (i.e., identifying that the entity has linked cases using casing information) enables coordinating efforts among teams.

This specification describes a system that can accurately and efficiently generate a data structure that leverages a combinatorial representation of casing information associated with an entity across teams to determine and perform a corrective action. That is, the ability to generate a data structure that represents casing information in a consistent, efficient, and accurate manner can significantly enhance threat detection, improve risk assessment, and increase incident resolution throughput. For example, the data structure can be used to determine if an entity (e.g., fraudster) has linked cases and, in response, determine and perform a corrective action (e.g., freeze access to resources in online accounts). This is especially important for an enterprise setting, where the large number of entities, teams, and cases are such that conventional methods cannot manage the number of cases and entities, leading to slower response times, duplicated work, and overlooked connections between cases.

Further, this specification's described techniques for the consolidation of casing information from across multiple enterprise team servers into a data structure and subsequently determining and performing of a corrective action enhances threat detection, improves risk assessment, and increases incident resolution throughput. Although automated methods for consolidating casing information from multiple enterprise team servers may exist—such as merging data sources from different teams and using SQL functions to match patterns and filter unique identifiers—these methods often result in double counting or failure to identify cases. Additionally, these approaches do not determine or perform corrective actions. Indeed, any potential corrective actions engaged with using some such techniques would be deficient because of the issues of double counting and case identification failures. In contrast, this specification's described techniques determines and performs an appropriate action because the data structure used to determine that action provides a holistic view of casing information, without being affected by the issues of double counting or failed case identification. That is, the generated data structure's complete view of casing information across enterprise team servers through accurate and comprehensive case identification across all enterprise team servers ensures that determining the corrective action accounts for complete information. In this manner, the security of networked environments (particularly enterprise networks) can be significantly improved and threats posed by digital entities in such environments can be reduced or mitigated by comprehensive and holistic identification of threat across the entire network/environment.

The details of one or more embodiments of the subject matter of this specification are set forth in the accompanying drawings and the description below.

Other features, aspects, and advantages of the subject matter will become apparent from the description, the drawings, and the claims.

DETAILED DESCRIPTION

Figure 1:
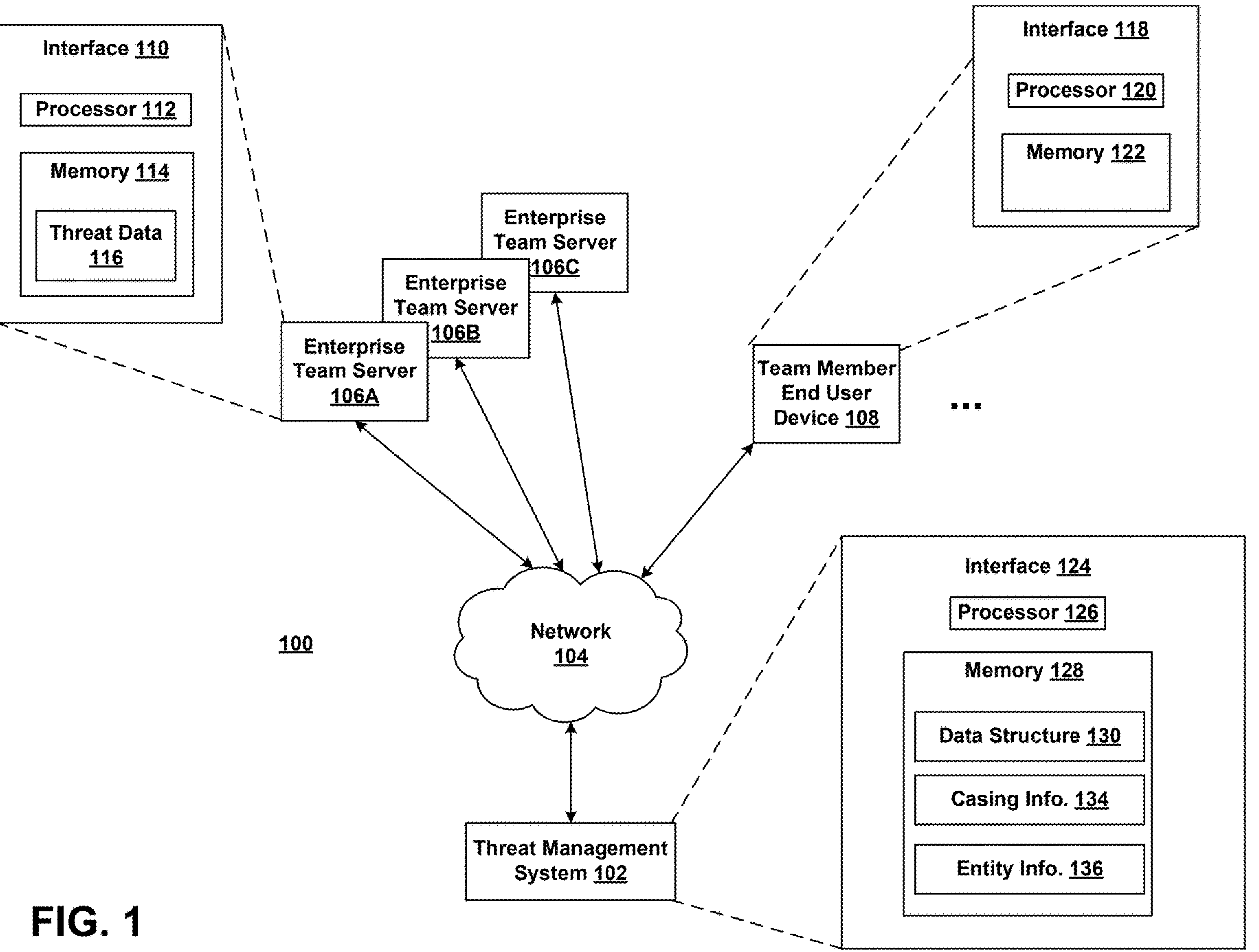
FIG. 1 shows an example networked environment for generating a data structure to facilitate digital threat detection in a networked environment.

FIG. 1 shows an example networked environment 100 for generating a data structure to facilitate digital threat detection in a networked environment, and determining and performing a corrective action. As further described with reference to FIG. 1, the environment 100 implements a threat management system 102 that interoperates with enterprise team servers 106A-C through a network 104 to generate a data structure that the system uses to determine and perform a corrective action.

The techniques described herein can be used in the context of network security and in particular, accurate detection of threats posed by entities in a networked environment and taking corrective action in response to such detection. One skilled in the art will appreciate that the described techniques are not limited to this network security application and can be applicable in other contexts. For example, in some implementations, the described techniques can be used to detect fraud and take corrective actions to stop further fraud. In this example, using the described techniques, fraudulent activity can be detected, e.g., in certain types of digital activity (e.g., account activity on digital accounts, such as credit accounts), and corrective actions can be taken to mitigate or address the threat, e.g., stop further fraud, identify the threat actor, pause or limit activity associated with the particular account or token (e.g., a particular account or payment token) for a certain timeframe or until a new token is issued.

In the network security use case that is provided in the context of FIG. 1, a threat management system 102 can receive entity data from another system to generate a data structure by aggregating casing information from a plurality of enterprise team servers to determine and perform a corrective action. That is, the threat management system 102 can continuously receive data of an entity from another system that is continuously performing actions (e.g., an identity management system, a security information system, an event identification system, an intrusion prevention system, and so on, i.e., a team member end user device configured to serve as an event identification system, or an intrusion prevention system, or any other system).

Network 140 facilitates wireless or wireline communications between the components of the environment 100 (e.g., between the threat management system 102 and the enterprise team servers 106A-C, etc.), as well as with any other local or remote computers, such as additional mobile devices, clients, servers, or other devices communicably coupled to network 140, including those not illustrated in FIG. 1.

For this network security use case, the corrective action can be, e.g., to restrict access to resources within the networked environment.

In particular, the illustrated implementation is directed to a solution where the threat management system 102 receives data of an entity from a team member end user device 108 serving as "the other system" continuously performing actions. The threat management system 102 then initializes a data structure that includes entity information and casing information associated with the entity. The casing information associated with the entity includes, for each of one or more enterprise team servers 106A-C, whether the team serve maintains cases regarding the entity and the status of those cases. After initialization of the data structure, the threat management system 102 transmits to each of the one or more enterprise team servers a request that includes a request for relevant data to the casing information associated with the entity. In response to the request, each of the one or more enterprise team servers transmits to the threat management system 102 a response that includes relevant data to casting information associated with the entity. The threat management system 102 next updates the data structure using its received response from the enterprise team servers 106A-C. Then the threat management system 102 determines a corrective action using the updated data structure and performs the corrective action.

If the data structure corresponds to that of a threat entity that poses an actual threat, the threat management system 102 determines and performs an appropriate action. For example, the action can be for the threat management system to take remediation action in response to determining the presence of a threat entity, such as, e.g., controlling access of the threat entity to network resources.

As another example, the action can be to communicate with another system (e.g., access control engine or any other network security related system that can take action against the entity) to restrict the access of the entity to the network.

Additionally, if the data structure does not correspond to that of a threat entity that poses an actual threat, the threat management system 102 still determines and performs an appropriate action. In some implementations, for example, the action can be to take no further action.

As another example, the action can be to communicate with another system (e.g., access control engine or any other network security related system that can take action against the entity) to take the action of taking no further action.

As described above, and in general, the environment 100 enables the illustrated components to share and communicate information across devices and systems (e.g., threat management system 102, enterprise team servers 106A-C, team member end user device 108, among others) via network 104. As described herein, the threat management system 102, enterprise team servers 106A-C, team member end user device 108 may be cloud-based components or systems (e.g., partially or fully), while in other instances, non-cloud-based systems may be used. In some instances, non-cloud-based systems, such as on-premise systems, client-server applications, and applications running on one or more client devices, as well as combinations thereof, may use or adapt the processes described herein. Although components are shown individually, in some implementations, functionality of two or more components, systems, or servers may be provided by a single component, system, or server. Conversely, functionality that is shown or described as being performed by one component, may be performed and/or provided by two or more components, systems, or servers.

As used in the present disclosure, the term "computer" is intended to encompass any suitable processing device. For example, the threat management system 102, enterprise team servers 106A-C, and/or team member end user device 108 may be any computer or processing devices such as, for example, a blade server, general-purpose personal computer (PC), Mac®, workstation, UNIX-based workstation, or any other suitable device. Moreover, although FIG. 1 illustrates a single threat management system 102, three enterprise team servers 106A-C, and a single team member end user device 108, any one of the threat management system 102, the enterprise team servers 106A-C, and the team member end user device 108 can be implemented using a single system or more than those illustrated, as well as computers other than servers, including a server pool. In other words, the present disclosure contemplates computers other than general-purpose computers, as well as computers without conventional operating systems.

As illustrated, the threat management system 102 includes or is associated with interface 124, processor(s) 126, memory 128, data structure 130, casing information 134, and entity information 136. While illustrated as provided by or included in the threat management system 102, parts of the illustrated components/functionality of the threat management system 102 may be separate or remote from the threat management system 102, or the threat management system 102 may itself be distributed across the network 104.

The interface 124 of the threat management system 102 is used by the threat management system 102 for communicating with other systems in a distributed environment—including within the environment 100—connected to the network 104, e.g., the enterprise team servers 106A-C, the team member end user device 108, and other systems communicably coupled to the illustrated threat management system 102 and/or network 104. Generally, the interface 124 comprises logic encoded in software and/or hardware in a suitable combination and operable to communicate with the network 104 and other components. More specifically, the interface 124 can comprise software supporting one or more communication protocols associated with communications such that the network 104 and/or interface's hardware is operable to communicate physical signals within and outside of the illustrated environment 100. Still further, the interface 124 can allow the threat management system 102 to communicate with the enterprise team servers 106A-C, the team member end user device 108 and/or other portions illustrated within the threat management system 102 to perform the operations described herein.

The threat management system 102, as illustrated, includes one or more processors 126. Although illustrated as a single processor 126 in FIG. 1, multiple processors may be used according to particular needs, desires, or particular implementations of the environment 100. Each processor 126 may be a central processing unit (CPU), an application specific integrated circuit (ASIC), a field-programmable gate array (FPGA), or another suitable component. Generally, the processor 126 executes instructions and manipulates data to perform the operations of the threat management system 102. Specifically, the processor 126 executes the algorithms and operations described in the illustrated figures, as well as the various software modules and functionality, including the functionality for sending communications to and receiving transmissions from the enterprise team servers 106A-C, the team member end user device 108, as well as to other devices and systems. Each processor 126 may have a single or multiple core, with each core available to host and execute an individual processing thread. Further, the number of, types of, and particular processors 126 used to execute the operations described herein may be dynamically determined based on a number of requests, interactions, and operations associated with the threat management system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including, e.g., C, C++, JavaScript, Java™, Visual Basic, assembler, Peri®, any suitable version of 4GL, as well as others.

The threat management system 102 can include, among other components, one or more applications, entities, programs, agents, or other software or similar components configured to perform the operations described herein.

The threat management system 102 also includes memory 128, which may represent a single memory or multiple memories. The memory 128 may include any memory or database module and may take the form of volatile or non-volatile memory including, without limitation, magnetic media, optical media, random access memory (RAM), read-only memory (ROM), removable media, or any other suitable local or remote memory component. The memory 128 may store various objects or data associated with the threat management system 102, including any parameters, variables, algorithms, instructions, rules, constraints, or references thereto. While illustrated within the threat management system 102, memory 128 or any portion thereof, including some or all of the particular illustrated components, may be located remote from the threat management system 102 in some instances, including as a cloud application or repository, or as a separate cloud application or repository when the threat management system 102 itself is a cloud-based system. As illustrated, memory 128 includes, entity information 136 (e.g., entity identification information, connections to other entities, or groups, activity history of the entity), casing information 134 (e.g., information of cases, e.g., number and status of cases, associated with the entity), and a data structure 130 (i.e., digital object that organizes, stores, and manages casing information 136 and entity information 136). Further details of entity information 136, casing information 134, and data structures 130 are described below.

Network 104 facilitates wireless or wireline communications between the components of the environment 100 (e.g., between the threat management system 102, the enterprise team servers 106A-C, the team member end user device 108, etc.), as well as with any other local or remote computers, such as additional mobile devices, clients, servers, or other devices communicably coupled to network 104, including those not illustrated in FIG. 1. In the illustrated environment, the network 104 is depicted as a single network, but may be comprised of more than one network without departing from the scope of this disclosure, so long as at least a portion of the network 104 may facilitate communications between senders and recipients. In some instances, one or more of the illustrated components (e.g., the threat management system 102, the enterprise team servers 106A-C, the team member end user device 108, etc.) may be included within or deployed to the network 104 or a portion thereof as one or more cloud-based services or operations. The network 104 may be all or a portion of an enterprise or secured network, while in another instance, at least a portion of the network 104 may represent a connection to the Internet. In some instances, a portion of the network 104 may be a virtual private network (VPN). Further, all or a portion of the network 104 can comprise either a wireline or wireless link. Example wireless links may include 802.11a/b/g/n/ac, 802.20, WiMAX, LTE, and/or any other appropriate wireless link. In other words, the network 104 encompasses any internal or external network, networks, sub-network, or combination thereof operable to facilitate communications between various computing components inside and outside the illustrated environment 100. The network 104 may communicate, for example, Internet Protocol (IP) packets, Frame Relay frames, Asynchronous Transfer Mode (ATM) cells, voice, video, data, and other suitable information between network addresses. The network 104 may also include one or more local area networks (LANs), radio access networks (RANs), metropolitan area networks (MANs), wide area networks (WANs), all or a portion of the Internet, and/or any other communication system or systems at one or more locations.

As illustrated, one or more enterprise team servers 106A-C may be present in the example environment 100. Although FIG. 1 illustrates three team servers 106A-C, any number of team servers 106A-C may be present and accessible according to the particular implementations of the environment 100. Each team server 106A-C may be associated with a particular team (e.g., line of business, i.e., a distinct area of operations or a specific set of related products or services that a company offers) or may be associated with multiple teams. The team server 106A-C may be any of a variety of appropriate types of servers. That is, the team servers can be database servers, which store and manage databases for large-scale data retrieval and storage; web servers, which host websites and deliver web pages to clients' browsers; file servers, which provide a centralized location for storing and sharing files; application servers, which host and run applications, providing business logic and processing for applications; or any other type of servers. Additionally, the enterprise team servers 106A-C may be any computing device operable to communicate with the threat management system 102, other team enterprise server (s), team member end user device 108 and/or other components via network 104, as well as with the network 104 itself, using a wireline or wireless connection. Enterprise team servers 106A-C can communicate over the network 104 using any of a variety of methods, e.g., different protocols. For example, database servers can use SQL over TCP/IP, web servers can use HTTP/HTTPS, file servers can use SMB/CIFS or NFS, and application servers can use middleware protocols like SOAP or RESTful APIs. In a networked environment 100, multiple team servers 104A-C may be queried to provide data, each specializing in different functions but working together to deliver comprehensive results. As illustrated, the enterprise team servers 106A-C may include an interface 110 for communication (which may be operationally and/or structurally similar to interface 124), at least one processor 112 (which may be operationally and/or structurally similar to processor 126), and a memory 114 (similar to or different from memory 128) storing information associated with the enterprise team server 106A-C. In particular, the memory includes at least threat data 116 for the respective enterprise team, i.e., casing information and entity information for every threat actor the enterprise team server includes.

As illustrated, one or more team member end user devices 108 may be present in the example environment 100. Although FIG. 1 illustrates a single team member end user device 108, multiple team member end user devices may be present and in use according to the particular needs, desires, or particular implementations of the environment 100. Each team member end user device 108 may be associated with a particular user (e.g., an employee), or may be accessed by multiple users, where a particular user is associated with a current session or interaction at the team member end user device 108. The team member end user device 108 may be an employee device at which the user is linked or associated, or an employee device through which the user interacts with threat management system 102. As illustrated, the team member end user device 108 may include an interface 118 for communication (which may be operationally and/or structurally similar to interface 124, and 110), at least one processor 120 (which may be operationally and/or structurally similar to processor 126, and 112), and a memory 122 (similar to or different from memory 128, and 124) storing information associated with the team member end user device 108.

The illustrated team member end user device 108 is intended to encompass any computing device, such as a desktop computer, laptop/notebook computer, mobile device, smartphone, personal data assistant (PDA), tablet computing device, one or more processors within these devices, or any other suitable processing device. In general, the team member end user device 108 and its components may be adapted to execute any operating system. In some instances, the team member end user device 108 may be a computer that includes an input device, such as a keypad, touch screen, or other device(s) that can interact with one or more applications, such as one or more mobile applications, including for example a web browser, a banking application, or other suitable applications, and an output device that conveys information associated with the operation of the applications and their application windows to the user of the team member end user device 108. Such information may include digital data, visual information. Specifically, the team member end user device 108 may be any computing device operable to communicate with the threat management system 102, the enterprise team servers 106A-C, other team member end user device(s), and/or other components via network 104, as well as with the network 104 itself, using a wireline or wireless connection. In general, the team member end user device 108 comprises an electronic computer device operable to receive, transmit, process, and store any appropriate data associated with the environment 100 of FIG. 1.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
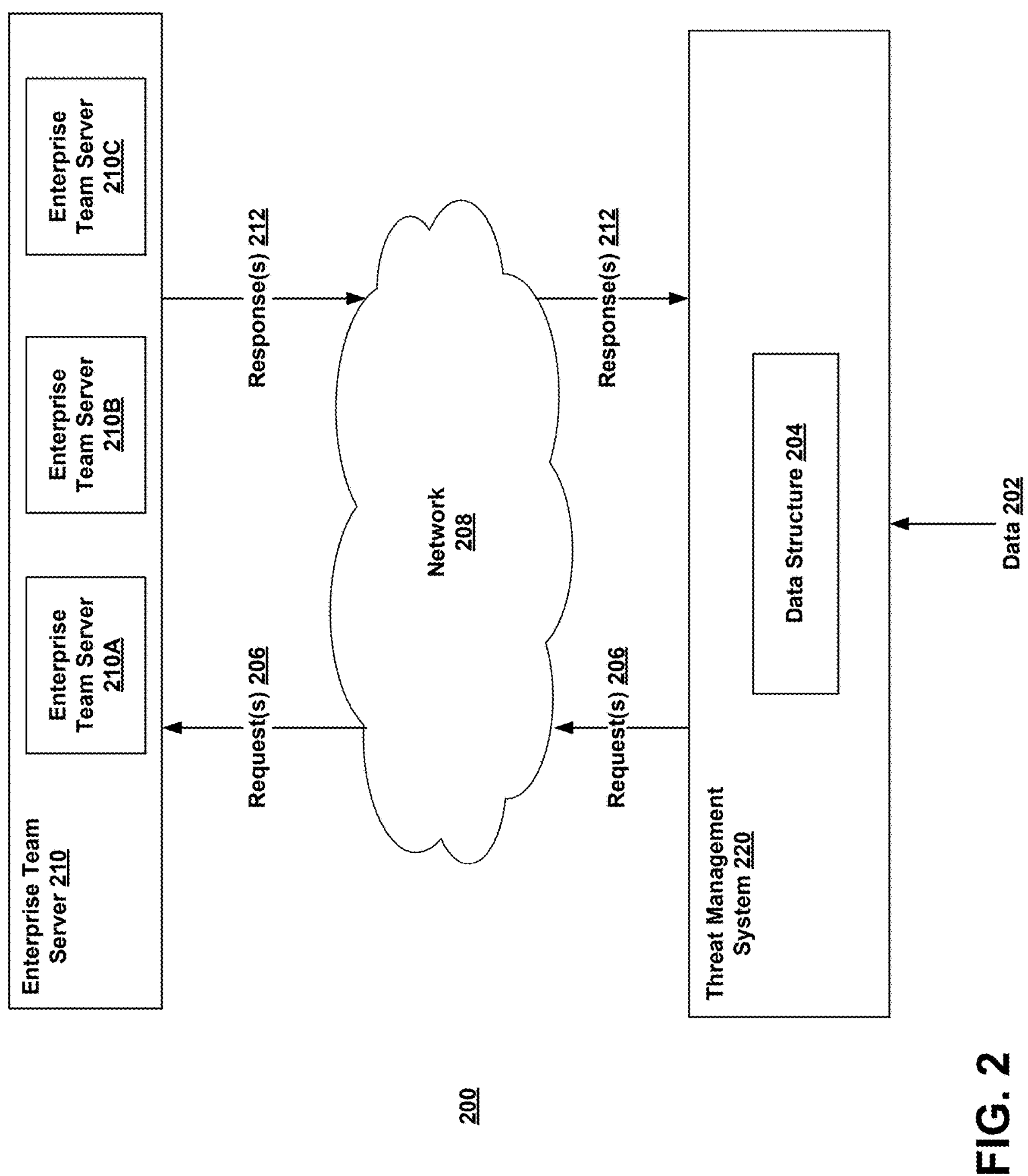
FIG. 2 shows an example networked environment.

FIG. 2 shows an example networked environment 200. The networked environment 200 is an example of a system implemented as computer programs on one or more computers in one or more locations, in which the systems, components, and techniques described below can be implemented.

In particular, the threat management system 220 receives data 202 of an entity in a digital environment from a user or another system. The digital environment can be any of a variety of digital environments, e.g., the networked environment of FIG. 1.

For example, the threat management system 220 can receive the data 202 from a user who is an employee within an organization (e.g., an information technology staff member, a security analyst, or any other appropriate employee). As another example, the threat management system 220 can receive the data 202 from another system (e.g., an identity management system, a security information system, an event identification system, an intrusion prevention system, and so on). As a particular example, the system 220 can receive the data 204 from another system that is executing a computer program (e.g., scheduled scripts for data extraction or reporting, scripts for automated incident response, scripts for monitoring and alerting that trigger actions based on security events). Such a server can be an enterprise team server, e.g., enterprise team server 210A, or any other appropriate server, or system.

Generally, the data 204 of the entity includes an identifier of the entity (e.g., a natural language text representation, or alphanumeric encoding representation).

For example, the entity identifier can be a full name (e.g., John Smith), an email address (e.g., john.smith@email_service.com), a custom identifier (e.g., 'VIP_CUSTOMER_123'), a username (e.g., jsmith555), an account number (e.g., 1234-123-2435), an IP addresses, or a mac address.

The threat management system 220 then initializes a data structure 204 that includes entity information and casing information associated with an entity. That is, the system 220 creates a data structure 204 and sets default values for the data values included in the data structure 204 that represent the entity information and casing information.

The data structure 204 can be any of a variety of types of collections of data values with defined relationships among the data values.

Generally, the data structure 204 includes a set of variables that includes a first variable representing an identifier of an entity, and, for each enterprise team server 210A-C that the threat management system 220 communicates with, a second variable that indicates if one or more cases associated with the entity are present in the respective enterprise team server 210A-C, and a third variable that indicates if one or more of the respective cases associated with the entity has an open status. Cases generally refers to structured digital files of security investigation cases where relevant data about security incidents are documented, e.g., documentation of all relevant information, evidence, and actions taken to address the incident initiated by a threat entity. The 'Open status' for a case generally means that the investigation is ongoing and that generally the case has not yet been resolved or closed, and further analysis, evidence gathering, or actions are required to reach a conclusion.

Generally, the casing information includes, for each enterprise team server 210A-C, whether the team maintains cases regarding the entity and whether the status of those cases (i.e., is the case open). The totality of each respective second variable for each enterprise team server and each respective third variable for each enterprise team server of the data structure 204, at least in part, make up the casing information.

Generally, the entity information includes at least an entity identifier. The first variable of the data structure 204, at least in part, makes up the entity information.

The threat management system 220 then transmits to each of one or more enterprise team servers 210 (i.e., enterprise team servers 210A-C) a request 206 that includes a request for relevant data including casing information associated with the entity through a network 208.

Generally, the enterprise team servers 210A-C can be any of a variety of systems, data repositories, software, and so on, that manage relevant data to casing information for a team and can communicate (i.e., receives requests 206 and send responses 212 through the network 208) with the threat management system 220. In the context of enterprise servers 210A-C relevant data to casing information is not necessarily an explicit representation of casing information but is the relevant data that contains sufficient information to determine the casing information. For example, while casing information indicates whether any cases associated with an entity have an open status, processing a list of all case IDs with open status for the entity (i.e., determining if the count of open cases is greater than one) can confirm that at least one case is open while not explicitly representing that at least one case is open. The relevant data to casing information stored in the team servers 210A-C may be either structured (i.e., organized and easily searchable, such as customer records in databases) or unstructured (i.e., lacking a predefined format, e.g., notes on a report of an incident).

After the threat management system 220 send the requests 206, the enterprise team servers 210A-C interpret the requests 206, and retrieve the relevant data from their storage, whether in structured databases or unstructured file systems. If needed, the enterprise team servers 210A-C perform operations like filtering, sorting, or aggregating the relevant data to meet the request's requirements. Generally though, the threat management server 220 is responsible for further processing this data and incorporate it into the appropriate data structures.

Subsequently, the threat management system 220 receives from each enterprise team server 210A-C a response 212 that includes relevant data to casing information associated with the entity through the network 208.

For example, the enterprise team servers can be physical servers, cloud-based servers, on-premises-based servers, tables of a SQL database, program objects, or any other digital or physical infrastructure that maintains casing information for a team.

Generally, each request 206 is data, a signal, a message, or a communication sent by the system 220 to each enterprise team server 210A-C, and each respective response 212 is data, a signal, a message, or a communication sent by the enterprise team server 210A-C and received by the system 220 in response to the respective request 206.

Generally, each request 206 to an enterprise team server 210A-C includes at least an identifier of the entity and parameters (potentially included in the data 204) that influence the response 212 of the enterprise team server 210. For example, a request 206 to an enterprise team server 210A-C can include, in addition to an identifier for an entity, parameters such as case creation date ranges, or geographic locations of case creation.

As a specific example, a request 206 to an enterprise team server can be a digital signal that triggers an enterprise team server 210 to send a response that includes relevant data that includes the number of cases a team has recorded regarding an entity with a particular identifier during a specified date range at specified geographic locations.

In some implementations, each request 206 to an enterprise team server 210A-C does not include an identifier. Instead, after receiving the response 212 from the enterprise team server 210A-C, the threat management system 220 later filters the response 212 for relevant data to casing information for the entity identifier.

Generally, the relevant data in each response 212 to each respective request 206 will be further processed by the system 220 when updating the data structure 204. That is, the system 220 processing the relevant data generally refers to the system 220 performing a series of actions or steps to transform, analyze, and interpret the data to extract meaningful information. For example, as described earlier, the relevant data can include a list of open case IDs associated with an entity identifier, which the system 220 can process (i.e., count the number of and evaluate if the count is greater than zero) to determine if any cases are associated with the entity.

As another example, the relevant data can include a list of closed case identifiers (i.e., identifiers for cases that are closed) that are associated with an entity identifier, and a list of open case identifiers (i.e., identifiers for cases that are open) that are associated with an entity identifier, which the system can use to determine which enterprise team servers maintain cases regarding the entity and the status of those cases (i.e., casing information).

In some cases, the request 206 includes a request for additional information and the response includes the additional information.

The system 220 updates the data structure 204 by processing the responses 212. That is, the system 220 updates the values of the variables included in the data structure 204 by at least appropriately processing the relevant data in the responses 212.

The system 220 then determines a corrective action using the data structure 204. That is, the system 220 evaluates the data values of the data structure to determine a corrective action.

For example, the system can evaluate a criterion using the data values of a data structure 204, and, if the criterion is satisfied, determine a corrective action with respect to the entity.

As a particular example, if an entity is a customer of a financial institution and the criterion is that the data structure indicates that the entity is associated with at least one open case, then the corrective action can be to enhance monitoring (e.g., trigger transaction activity monitoring of the entity), restrict access (e.g., trigger multi-factor authentication request), or initiate an audit (e.g., trigger an audit of security protocols intended to target the entity).

In some cases, the determined corrective action can be a deferment of action. That is, instead of taking an immediate action to address the issue, the decision is made to postpone any action. This deferment essentially translates to taking no action at the present moment, allowing for further observation or consideration by other systems.

The system 220 then performs the corrective action to completion. If the corrective action is a deferment of action, then the system determines the performance of the corrective action is complete.

In some cases, after generating the data structure 204, the system 220 provides the data structure 204 to a user, or another system for a downstream task. The downstream task can be any of a variety of tasks that use the data structure 204, e.g., storing the data structure in a database for future retrieval, generating a list of entities with active linked cases, executing a machine learning model, and so on.

Figure 3:
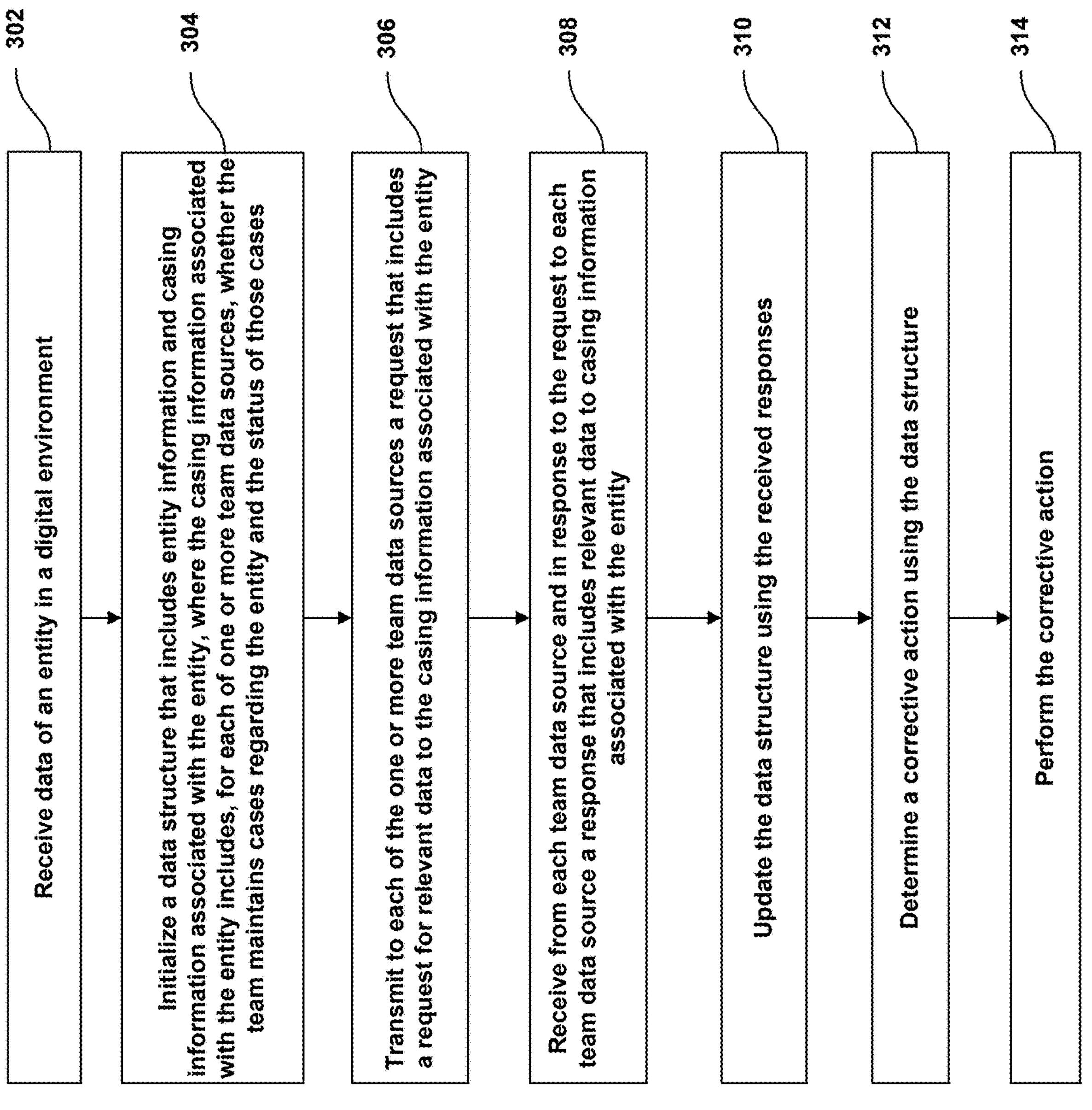
FIG. 3 is a flow diagram of an example process for generating a data structure and determining and performing a corrective action.

FIG. 3 is a flow diagram of an example 300 process for generating a data structure and determining and performing a corrective action. For convenience, the process 300 will be described as being performed by a system of one or more computers located in one or more locations. For example, a networked environment, e.g., the networked environment 200 of FIG. 2, and in particular threat management system 102/220 of FIG. 1 or 2, as appropriately programmed in accordance with this specification, can perform the process 300.

The system receives data of an entity in a digital environment (step 302). As described earlier, the system receives the data that includes at least the identifier for an entity in a digital environment from a user or another system.

In some cases, the data can include additional data related to the entity or related to the cases associated with the entity. For example, the data can include additional data related to the entity such as the type of entity (e.g., individual, business, previous customer, and so on), location (e.g., physical location, or digital location, such as IP address).

For example, the data can include additional data related to the cases associated with the entity such as case creation date ranges (i.e., a range of dates that relevant cases lie within), or case initiators (i.e., teams that relevant cases lie within).

The system initializes a data structure that includes entity information and casing information associated with the entity, where the casing information associated with the entity includes, for each of one or more enterprise team servers, whether the team maintains cases regarding the entity and the status of those cases (step 304). That is, the system sets up, or prepares a data structure for operations, such as storing, adding, retrieving, or manipulating variables values included in the data structure.

Generally, as described earlier, the data structure includes a set of variables that includes a first variable representing an identifier of an entity, and, for each enterprise team server that the threat management system communicates with, a second variable that indicates if one or more cases associated with the entity are present in the respective enterprise team server, and a third variable that indicates if one or more of the respective cases associated with the entity has an open status.

For example, the data structure can be a tuple, i.e., an ordered set of items, e.g., a Python list object or Python tuple object, with an ordered set of items corresponding to a first variable, a plurality of second variables, and a plurality of third variables, as described previously.

As another example, the data structure can be a class object, i.e., an object-oriented programming object, e.g., an instance of a Python class, with member variables corresponding to a first variable, a plurality of second variables, and a plurality of third variables, as described previously.

As another example, the system can initialize a computer programming object that represents the data structure. That is, the system can instantiate an object through a constructor of a class, e.g., C++ or Python class constructors, e.g., a C++ Struct constructor.

As another example, the data structure can be a file of a particular file format, e.g., JSON, YAML, XML, and so on, with contents that identify a first variable, a plurality of second variables, and a plurality of third variables, as described previously.

In some cases, the data structure is associated with a fixed size, i.e., immutable size. That is, at initialization, the system determines the size of the data structure, e.g., the number variables included in the data structure or an allotment of computer memory that corresponds to the number of variables included in the data structure, and cannot change its size.

For example, as described earlier, the system can allocate a pre-defined amount of computer memory for the data structure, and additionally, the data structure variable values can be set to an initial value, such that one or more variable values can be assigned a default value, e.g., the first variable can be set to an entity identifier, and the plurality of second and third variables can be set to a value of zero.

In other cases, the data structure is associated with a dynamic size, i.e., mutable size. That is, at initialization, the system determines the size of the data structure but can change its size at any time, e.g., add any number of variables to the data structure or increase memory allotment.

For example, the system can cause the amount of computer memory associated with the data structure to grow or shrink according to the number of enterprise team servers that the system will communicate with.

The system transmits to each of the one or more enterprise team servers a request that includes a request for relevant data to the casing information associated with the entity (step 306) using data, a signal, a message, or a communication. Generally, the request includes an identifier for the entity.

As described earlier, the request sent by the system to an enterprise team server can include parameters that influence the response of the enterprise team server. Such parameters, include any of a variety of types of data that influences the response of the enterprise team server.

For example, the request can include parameters that filter the relevant data to casing information that will be considered for a response according to meta data, e.g., an identifier associated with case, date of case inception, type of entity associated with case, degree of case importance, and so on.

The system receives from each enterprise team server and in response to the request to each enterprise team server, a response that includes relevant data to casing information associated with the entity (step 308). That is, the enterprise team server processes the request from step 306 to generate the response for the enterprise team server, and generally, the response contains the data the threat management system will process to update the data structure.

In some cases, the request includes a request for casing information regarding any related identifier to the identifier of the entity. That is, the request causes the enterprise team server to send a response that includes updated casing information of identifiers that are related to the identifier of the entity in terms of a string metric (e.g., Levenshtein distance, Hamming distance, and so on), pattern matching (e.g., using regular expressions) or both.

What follows are examples of requests to enterprise team servers and their corresponding responses.

Broadly, a request can be any function call to an enterprise team server and a response can be the return of that function call.

For example, a request can be a SQL query that contains expressions and functions in a SELECT clause and a WHERE clause to retrieve relevant data from one or more tables, while the response can be the resulting table of the SQL query. More specifically, the one or more tables can correspond to one or more enterprise team servers, and the returned SQL table of the query can be the response.

As another example, a request can be a Python Pandas (a Python library used for working with data sets) request, i.e., a function call to a Pandas data object, and the response is the function call return object. More specifically, the one or more Panda data frames can correspond to one or more enterprise team servers, and the response can be pandas type object, e.g., a data frame, a series, and so on.

As another example, a request can be a message sent to an API (application programming interface) to request data, and the response can be a returned JSON (JavaScript Object Notation) formatted file.

While a few particular examples of requests the system sends and responses the system receives are given above, the described techniques can be applied to any of a variety of requests and responses.

With these examples of requests that the system sends and responses that the system receives, attention is directed back to the initial description of the example process 300.

The system updates the data structure using the received responses (step 310). That is, the system processes the one or more responses to update the data structure.

In some cases, processing the responses to update the variables of the data structure may include directly updating the values included in the data structure with the values contained in the response.

For example, if the response for a team includes a value that indicates if one or more cases associated with the entity are present in the respective enterprise team server, then the second variable for the team can be set to the value. Additionally, if the response for a team includes a value that indicates if one or more of the respective cases associated with the entity has an open status, then the third variable for the team can be set to the value.

In other cases, processing the response may involve executing an algorithm or program to derive values from the response, and then updating the data structure with the derived values.

For example, if the response for a team includes the number of closed cases associated with an entity and the number of open cases that are associated with an entity, the system can determine if the number of closed and open cases is greater than zero (and in response set the second variable of the team to one) and then determine if the number of open cases is greater than zero (and in response set the third variable of the team to one).

As another example, if the response for a team includes a list of closed case identifiers that are associated with an entity identifier, and a list of open case identifiers that are associated with an entity identifier, the system can determine the length of the list of closed case identifiers and the length of the list of open case identifier. Then, in response to determining that the sum of lengths of the lists of open/closed case identifiers is greater than one, the system can set the first variable of the team to one. Then, in response to determining that the length of the list of open case identifiers is greater than zero, the system can set the second variable of the team to one.

Further details of an example process for updating a data structure are described below with reference to FIG. 4.

The system determines a corrective action using the data structure (step 312).

In some implementations, the system maintains mapping information that assigns, for each unique set of data values of the data structure, a corrective action. The system can then evaluate the data values of the data structure and use the mapping information to determine the corrective action.

As a particular example, suppose that there is a first team that maintains cases related to data breaching (i.e., unauthorized access to sensitive data, including personal information, financial records, or intellectual property) and a second team that maintains cases of identity fraud (i.e., entities that use stolen usernames and passwords to gain unauthorized access to accounts). If the data structure for an entity has casing information that indicate that there are open data breaching cases and open identity fraud cases, the corresponding mapped to corrective action can be to full access denial to all resources. Or, if the data structure for an entity has casing information that indicate that there are no data breaching cases and some identity fraud cases (but none are active), the corresponding mapped to corrective action can be to block access to certain system resources.

In some cases, the system implements the mapping information as a programming function within a program. That is, the system uses a computer program that receives the data values to generate an output that is the determined corrective action.

In some implementations, the system evaluating the data values of the data structure is part of a greater process for determining the corrective action. That is, the data values are not the only determining factors the system uses to determine the corrective action. For example, the system can use a computer program that receives the data values along with other values determined by the system, or one or more other systems, to generate an output that is the determined corrective action.

What follows are examples of corrective action.

For example, the corrective action can be activity monitoring, e.g., initiating an observation of the entity's activities.

As another example, the corrective action can be activity freezing, e.g., stopping the entity from performing any action in the networked environment.

As another example, the corrective action can be issuing an alert to relevant parties, e.g., issuing a fraud alert to staff for them to investigate.

As another example, the corrective action can be issuing a request for identification verification, e.g., issuing a request for multi-factor authentication, issuing a request for verifying a secured sent code, requesting a confirmed phone number, requesting a confirmed address, and so on.

As another example, the corrective action can be IP address blocking, e.g., blocking the IP address associated with the entity.

While a few particular examples of corrective actions are given above, the corrective action can be any of a variety of corrective actions.

With these examples of corrective actions, attention is directed back to the initial description of the example process 300.

The system performs the corrective action (step 314).

In some cases, the system provides the data structure to a user, or another system for a downstream task. Further details of an example process for providing the data structure for use in performing a downstream task are described below with reference to FIG. 5.

The system's consolidation of casing information from across a plurality of enterprise team servers into a data structure and subsequent determining and performing of a corrective action enhances threat detection, improves risk assessment, and increases incident resolution throughput. The advantages the system provides is due to the fact that when the system receives data of an entity and determines a corrective action, the system determines the corrective action using a holistic view of casing information. That is, the system's complete view of casing information across enterprise team servers ensures that determining the corrective action that accounts for complete information.

For example, casing information can provide how many teams have open cases associated with the entity, which can prevent duplicated corrective actions and increase incident resolution throughput by preventing wasted duplicated corrective actions. As a particular example, a first generation of a data structure can result in a corrective action that causes a first team to open a case. Then a second generation of the data structure can result in a corrective action of deferment of action because the first team already has an open case.

As another example, casing information can provide information of what types of teams have cases which can improve risk assessment of entities. As a particular example, when the teams are correlated with risk levels, e.g., entities with open cases with the 'money laundering investigation team' pose a higher risk than entities with open cases with the 'transaction dispute team' determining the corrective action can more appropriately align with the risk level of the entity.

Additionally, the data structure's casing information, which preserves associations of entities who are threat actors to teams over time, provides another advantage. For example, an entity might have a previously closed case associated with one team and a newly opened case associated with another team. Using the preserved associations, instead of using only the association of the currently open case, enables the system to accurately assess risk scores for entities by incorporating both past and present information.

Consequently, the system enhances threat detection and increase incident resolution throughput using the generated data structure to determine and perform a corrective action.

Figure 4:
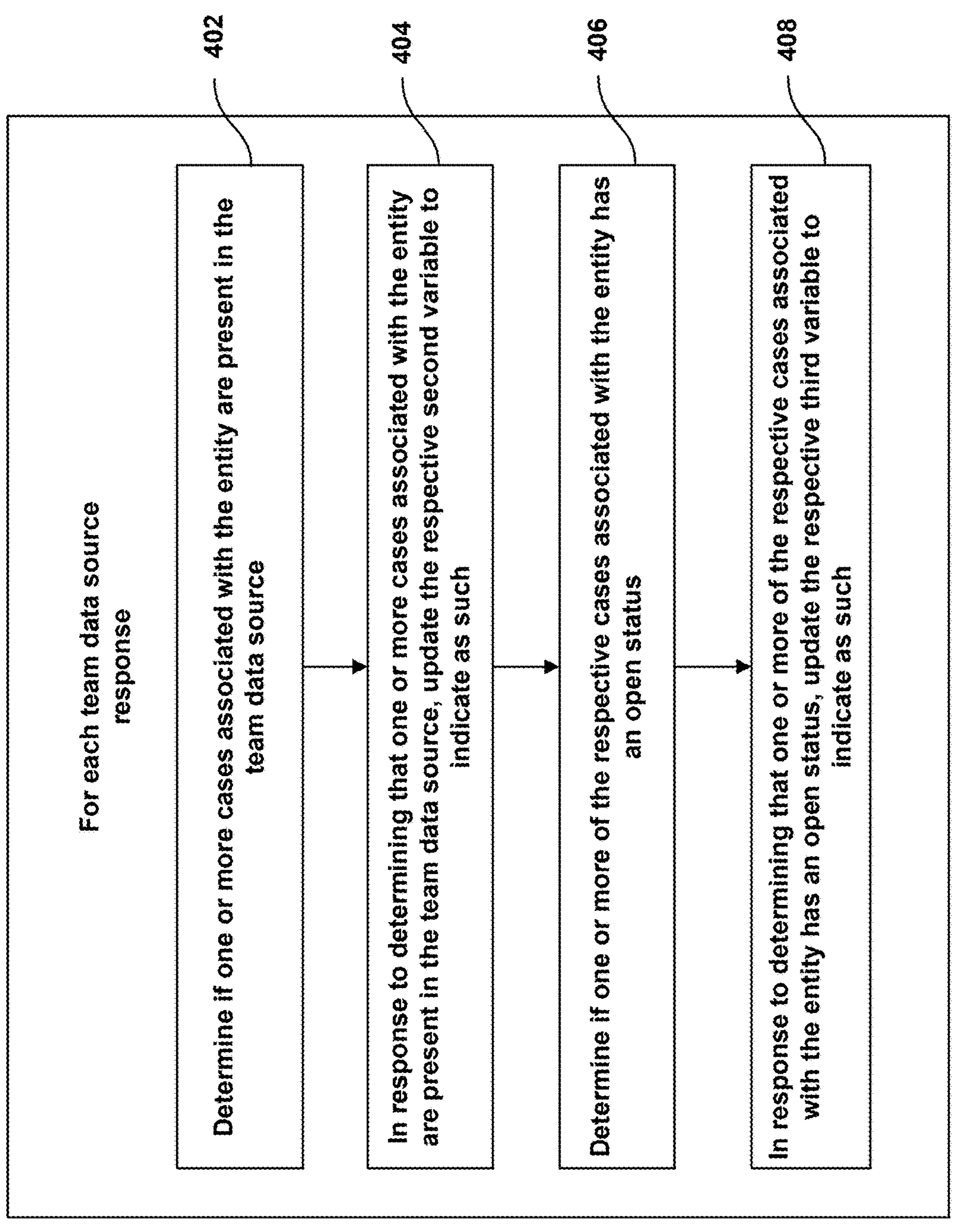
FIG. 4 is a flow diagram of an example process for updating a data structure.

FIG. 4 is a flow diagram of an example 400 process for updating a data structure. For convenience, the process 400 will be described as being performed by a system of one or more computers located in one or more locations. For example, a networked environment, e.g., the networked environment 200 of FIG. 2, appropriately programmed in accordance with this specification, can perform the process 400.

For each enterprise team server response, the system performs steps 402-408.

The system determines if one or more cases associated with the entity are present in the enterprise team server (step 402).

In some cases, when the response includes a variable value that represents the statement 'one or more cases are associated with entity are present in the enterprise team server' (e.g., a binary variable that has a value of one when the statement is true and a value of zero when the statement is false) the system evaluates the variable value to determine if one or more cases associated with the entity are present in the enterprise team server.

In other cases, the system performs an algorithm or executes a program to determine if one or more cases associated with the entity are present in the enterprise team server.

For example, when the response contains a set of case identifiers associated with the entity, an algorithm or program can count the number of case identifiers and evaluate if the number is greater than one to determine if one or more cases associated with the entity are present in the enterprise team server.

In some implementations, when data in enterprise team servers are updated at different times (e.g., different days of the week or month), the system can ensure data synchronization (i.e., request that servers refresh their data to be up-to-date) before determining if one or more cases associated with the entity are present in the enterprise team server. Ensuring that data from all enterprise team servers are up-to-date before receiving it enables accurate and reliable updates to the data structure based on the most current and reliable information.

In some other implementations, the system can perform data recency assessment while determining if one or more cases associated with the entity are present in the enterprise team server. That is, the system can retrieve dates and times of the most recent updates (which, e.g., the system can be configured to store in association with the updates) to the enterprise team servers, which can be stored in the data structure for the system or a user to assess how up to date the data across teams servers are later.

The system, in response to determining that one or more cases associated with the entity are present in the enterprise team server, updates the respective second variable to indicate as such (step 404). That is, the variable value within the data structure is updated to reflect if one or more cases associated with the entity are present in the enterprise team server.

For example, when the second variable is a binary variable, the second variable can be updated from a zero to a one to indicate one or more cases associated with the entity are present in the enterprise team server.

As another example, when the second variable is a Boolean variable, the second variable can be updated from False to True to indicate one or more cases associated with the entity are present in the enterprise team server.

As another example, when the second variable is a string variable (i.e., natural language text), the second variable can be updated from "No" to "Yes" to indicate one or more cases associated with the entity are present in the enterprise team server.

The system determines if one or more of the respective cases associated with the entity has an open status (step 406).

In some cases, when the response includes a variable value that directly represents the statement 'one or more of the respective cases associated with the entity has an open status' (e.g., a binary variable that has a value of one when the statement is true and a value of zero when the statement is false) the system evaluates the variable value to determine if one or more of the respective cases associated with the entity has an open status.

In other cases, the system performs an algorithm or executes a program to determine if one or more of the respective cases associated with the entity has an open status.

For example, when the response contains a set of case class objects (i.e., programming class objects that represent a case) associate with the entity, an algorithm or program can count the number of case objects whose Boolean member variable that represents cases status is true and evaluate if the number is greater than one to determine if one or more of the respective cases associated with the entity has an open status.

The system, in response to determining that one or more of the respective cases associated with the entity has an open status, updates the respective third variable to indicate as such (step 408).

For example, when the third variable is a binary variable, the third variable can be updated from a zero to a one to indicate one or more of the respective cases associated with the entity has an open status.

As another example, when the third variable is a Boolean variable, the third variable can be updated from False to True to one or more of the respective cases associated with the entity has an open status.

As another example, when the third variable is a string variable (i.e., natural language text), the second third can be updated from "No" to "Yes" to indicate one or more of the respective cases associated with the entity has an open status.

In some cases, the system performs steps 402-408 for each enterprise team server response in an inter-parallel manner, an intra-parallel manner, or both. That is, the system can process each enterprise team server response using a respective hardware device (inter-parallelism), and each hardware device can perform steps 402-408 using parallel processing hardware (intra-parallelism).

Figure 5:
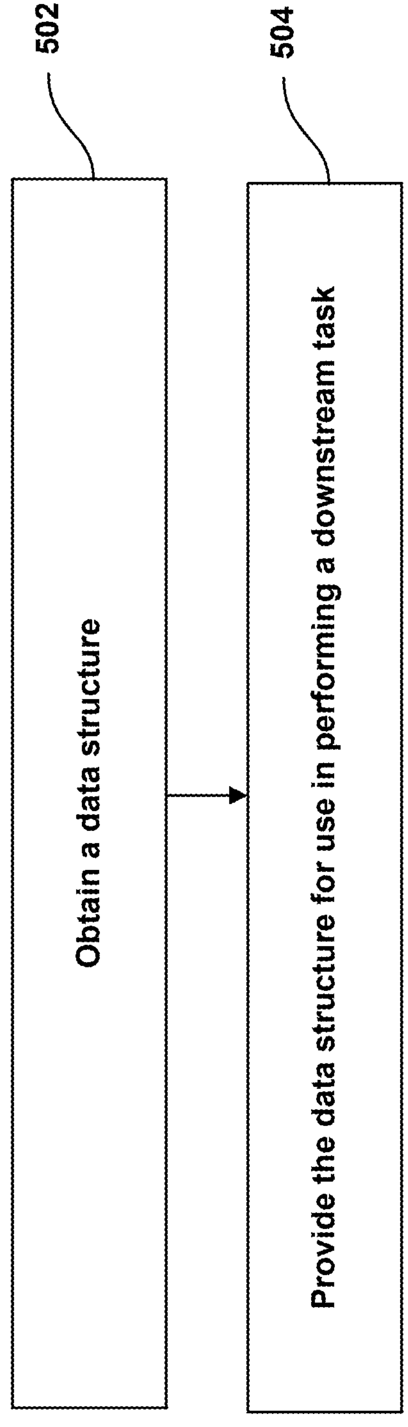
FIG. 5 is a flow diagram of an example process for providing the data structure for use in performing a downstream task.

FIG. 5 is a flow diagram of an example 500 process for providing the data structure for use in performing a downstream task. For convenience, the process 500 will be described as being performed by a system of one or more computers located in one or more locations. For example, a networked environment, e.g., the networked environment 200 of FIG. 2, appropriately programmed in accordance with this specification, can perform the process 500.

The system obtains a data structure (step 502), e.g., the system performs process 300 as described with reference to FIG. 3.

The system provides the data structure for use in performing a downstream task (step 504). The act of providing refers to the system making the data structure available for reading and manipulation to itself, a user, or another system.

The downstream task can be any of a variety of tasks that use the data structure 204, e.g., storing the data structure in a database for future retrieval, generating a list of entities with active linked cases, executing a machine learning model, and so on.

As a particular example, if the downstream task is storing the data structure in a database for future retrieval, after generating the data structure, the system stores the data structure in a database for subsequent use for when the system receives data of the same entity again. That is, before the system generates a data structure for an entity, it can search an appropriate database for a data structure associated with the entity, and in response to finding a data structure, uses the found data structure as the data structure instead of initializing or generating a new data structure. When the system does not find an appropriate data structure in the database, the system generates the data structure, and determines and performs a corrective action as described previously. Then, as the downstream task, stores the data structure in the appropriate database.

For these cases, the storage and reuse of the data structure provides computational memory and efficiency advantages. That is, because only a single copy of a data structure for an entity exists in a network, duplicate copies do not exist, and because the system can avoid one or more steps associated with generating the data structure, execution time decreases for generating the data structure decreases.

As another particular example, the downstream task can be to count the number of "entities with active linked cases." That is, the system can generate a data structure for every known entity (or a given list of entities) and then use an algorithm or program to count the number of entities with active linked cases, i.e., number of entities with associated cases that appear in two or more enterprise team servers and that include at least one active associated case.

For this example, the data structure can be a tuple representation $(z, i_1, i_2, i_3, \ldots, s_1, s_2, s_3, \ldots)$, where the z variable corresponds to an entity's identifier, the variables $i_T$ is a binary variable that represents if a case against the entity is investigated by team T (having a value of 1 for yes and 0 for no), and $s_T$ is a binary variable that represent the status of an investigation case in a team T (having a 1 for open status and 0 for closed status). While only three teams (i.e., T=1, T=2, T=3) are specified in the example tuple, in practice any number of N teams can be present (as is denoted by the ellipses).

For this example, an algorithm or program can process all N data structures (one data structure for each of the N teams) to determine a set of all active linked cases. That is, an algorithm or program can be used to determine a set L of all active linked cases as the set of all tuples for which at least two or more teams have a case against the entity that is investigated and at least one of those cases is open, i.e., $L=\{(z, i_1, \ldots, i_N, s_1, \ldots, s_N);$ $$\sum_{t=1}^{N} i_t \geq 2 \,\&\, \sum_{t=1}^{N} s_t \geq 1\Big\}.$$

For this example, an example pseudo Python-Pandas-like program for determining a set of linked cases is shown in Table 1, where there are three enterprise team servers (i.e., T_G, T_A, and T_H), the data structure is a tuple (z, g, a, h, sg, sa, sh), the list of entities is represented as names, a list of similar identifiers to z present in names according to a string metric is represented as close_matches, and the set of linked cases is represented as the term linked_cases. After the execution of the program, the program can count the elements of linked_cases (i.e., the set L of all active linked cases) to determine the number of active linked cases.

TABLE 1

```
def report_closest(z):
 g=a=h=sg=sa=sh=0 #initialize all variables to 0,
  #Get all close matches of z: may not be needed for this paper
  close_matches = get_close_matches(z, names, n=6, cutoff=0.9)
  for match in close_matches:
    if match T_G ['Name'].tolist( ):
          i_G = 1
          if T_G.loc[T_G ['Name'] == match, 'Status'].iloc[0] == 'Open':
                 s_G = 1
     if match in T_A['Name'].tolist( ):
           i_A = 1
           if T_A.loc[T_A ['Name'] == match, 'Status'].iloc[0] == 'Open':
                   s_A = 1
      if match in T_H['Name'].tolist( ):
            i_H = 1
            if T_H.loc[T_H ['Name'] == match, 'Status'].iloc[0] == 'Open':
                s_H = 1
   return (z, i_A, i_G, i_H, s_A, s_G, s_H)
        names_non_null = list(filter(None, names)) #drop null names
        names_report = set(report_closest(z) for z in names_non_null)
        linked_cases = [ ]
        for case in names_report:
           team = case[1]+case[2]+case[3]
           active = case[4]+case[5]+case[6]
           if team >= 2:
              if active >= 1:
                 linked_cases.append(case)
```

This example also illustrates the advantage of the data structure storing casing information associated with an entity across teams in a networked environment. The number of requests and responses needed for the system to update variables of all data structure scales linearly with the number of team data sources. And, the number of data structures the system processes to determine the number of linked cases also scales linearly with the number of data structures, making determining the number of entities with active linked cases using the data structures scale linear.

In contrast, a conventional method that does not leverage the described data structure to determine the number of entities with active linked cases, can scale exponentially with the number of team data sources. For example, a traditional method, e.g., a sequence of SQL calls to join and merge tables, can involve communicating with every team data source to retrieve entities with active cases, counting the number of entities with active cases for each team data source, and then correcting for the number of entities that have be over counted (i.e., that have been counted from multiple team data sources). It is the step of correcting for the number of entities that have been over counted that is exponentially scaling, making the overall process exponentially scaling. For example, consider two sets of entities with open cases A and B from two respective team data sources. Then, to determine the number of linked cases the union must be determined, i.e., $|A \cup B| = |A| + |B| - |A \cap B]$, where the term $|A \cap B|$ is the overcount that must be determined. If three sets of entities with open cases A, B, and C from three respective team data sources, then, to determine the number of linked cases the union must be determined, i.e., $|A \cup B \cup C| = |A| + |B| + |C| - |A \cap B| - |A \cap C| - |B \cap C| + |A \cap B \cap C|$, where the terms $|A \cap B| - |A \cap C| - |B \cap C| + |A \cap B \cap C|$ are the overcount that must be determined. As this illustrates, as the number of team data sources grows, determining the overcount becomes complex, with the computational effort scaling exponentially and exceeding compute resources.

As another example, the downstream task can be to execute a machine learning model on an input that includes the data structure. As a more specific example, a machine learning model that predicts the risk level of an entity can have a portion of its input correspond to the values of the variables included in the data structure. So, after the system generates the data structure, the appropriate machine learning model inputs can be determined.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:

receiving data of an entity in a digital environment;

initializing a data structure comprising entity information and casing information associated with the entity, wherein the casing information associated with the entity comprises, for each of one or more enterprise team servers corresponding one or more enterprise teams, whether the enterprise team maintains cases regarding the entity, including status of the cases;

transmitting to each of the one or more enterprise team servers, a request comprising a request for relevant data to the casing information associated with the entity;

receiving, from each enterprise team server and in response to the request to each enterprise team server, a response comprising relevant data to casing information associated with the entity;

updating the data structure using the received responses;

determining a corrective action using data regarding one or more ongoing cases corresponding to the entity obtained upon querying the data structure; and performing the corrective action with respect to the entity, wherein the data structure comprises a first variable that represents an identifier of an entity, a second variable for each enterprise team server that indicates if one or more cases associated with the entity is present in the enterprise team server, and a third variable for each enterprise team server that indicates if one or more of the respective cases associated with the entity has an open status, and wherein updating the data structure representing casing information associated with the entity using the received responses comprises:

setting every second and third variable to zero;

for each enterprise team server response, determining if one or more cases associated with the entity is present in the enterprise team server;

in response to determining that one or more cases associated with the entity is present in the enterprise team server, updating the respective second variable to indicate as such;

determining if one or more of the respective cases associated with the entity has an open status; and in response to determining that one or more of the respective cases associated with the entity has an open status, updating the respective third variable to indicate as such.

2. The method of claim 1, wherein the request comprising the request for relevant data to the casing information associated with the entity further comprises a request for relevant data to the casing information associated with any related identifier of the entity.

3. The method of claim 2, wherein any related identifier of the entity comprises identifiers determined using a string metric.

4. The method of claim 2, wherein any related identifier of the entity comprises identifiers determined using pattern matching.

5. The method of claim 1, further comprising providing the data structure for use in performing a downstream task.

6. The method of claim 5, wherein the downstream task comprises storing the data structure in a database for subsequent retrieval.

7. The method of claim 6, wherein the downstream task comprises:

generating a plurality of data structures for a respective plurality of entities; and counting a number of data structures that reflect more than one team having one or more cases associated with the respective entity, and at least one of the cases associated with the respective entity having an open status.

8. The method of claim 6, wherein the downstream task comprises:

using a machine learning model to process the data structure.

9. A system comprising:

one or more computers comprising at least one processor and memory; and one or more storage devices storing instructions that, when executed by the one or more computers, cause the one or more computers to perform operations, comprising:

receiving data of an entity in a digital environment;

initializing a data structure comprising entity information and casing information associated with the entity, wherein the casing information associated with the entity comprises, for each of one or more enterprise team servers corresponding one or more enterprise teams, whether the enterprise team maintains cases regarding the entity, including status of the cases;

transmitting to each of the one or more enterprise team servers, a request comprising a request for relevant data to the casing information associated with the entity;

receiving, from each enterprise team server and in response to the request to each enterprise team server, a response comprising relevant data to casing information associated with the entity;

updating the data structure using the received responses;

determining a corrective action using data regarding one or more ongoing cases corresponding to the entity obtained upon querying the data structure; and performing the corrective action with respect to the entity, wherein the data structure comprises a first variable that represents an identifier of an entity, a second variable for each enterprise team server that indicates if one or more cases associated with the entity is present in the enterprise team server, and a third variable for each enterprise team server that indicates if one or more of the respective cases associated with the entity has an open status, and wherein updating the data structure representing casing information associated with the entity using the received responses comprises:

setting every second and third variable to zero;

for each enterprise team server response, determining if one or more cases associated with the entity is present in the enterprise team server;

in response to determining that one or more cases associated with the entity is present in the enterprise team server, updating the respective second variable to indicate as such;

determining if one or more of the respective cases associated with the entity has an open status; and in response to determining that one or more of the respective cases associated with the entity has an open status, updating the respective third variable to indicate as such.

10. The system of claim 9, wherein the request comprising the request for relevant data to the casing information associated with the entity further comprises a request for relevant data to the casing information associated with any related identifier of the entity.

11. The system of claim 10, wherein any related identifier of the entity comprises identifiers determined using a string metric.

12. The system of claim 10, wherein any related identifier of the entity comprises identifiers determined using pattern matching.

13. The system of claim 9, wherein the operations further comprising:

providing the data structure for use in performing a downstream task.

14. The system of claim 13, wherein the downstream task comprises storing the data structure in a database for subsequent retrieval.

15. The system of claim 14, wherein the downstream task comprises:

generating a plurality of data structures for a respective plurality of entities; and counting a number of data structures that reflect more than one team having one or more cases associated with the respective entity, and at least one of the cases associated with the respective entity having an open status.

16. One or more non-transitory computer-readable storage media storing instructions that when executed by one or more computers cause the one or more computers to perform operations, comprising:

receiving data of an entity in a digital environment;

initializing a data structure comprising entity information and casing information associated with the entity, wherein the casing information associated with the entity comprises, for each of one or more enterprise team servers corresponding one or more enterprise teams, whether the enterprise team maintains cases regarding the entity, including status of the cases;

transmitting to each of the one or more enterprise team servers, a request comprising a request for relevant data to the casing information associated with the entity;

receiving, from each enterprise team server and in response to the request to each enterprise team server, a response comprising relevant data to casing information associated with the entity;

updating the data structure using the received responses;

determining a corrective action using data regarding one or more ongoing cases corresponding to the entity obtained upon querying the data structure; and performing the corrective action with respect to the entity wherein the data structure comprises a first variable that represents an identifier of an entity, a second variable for each enterprise team server that indicates if one or more cases associated with the entity is present in the enterprise team server, and a third variable for each enterprise team server that indicates if one or more of the respective cases associated with the entity has an open status, and wherein updating the data structure representing casing information associated with the entity using the received responses comprises:

setting every second and third variable to zero;

for each enterprise team server response, determining if one or more cases associated with the entity is present in the enterprise team server;

in response to determining that one or more cases associated with the entity is present in the enterprise team server, updating the respective second variable to indicate as such;

determining if one or more of the respective cases associated with the entity has an open status; and in response to determining that one or more of the respective cases associated with the entity has an open status, updating the respective third variable to indicate as such.

* * * * *